United States Patent
Luan et al.

(10) Patent No.: US 11,929,861 B2
(45) Date of Patent: Mar. 12, 2024

(54) SIGNAL TRANSMITTING METHOD AND APPARATUS, STORAGE MEDIUM, AND USER TERMINAL

(71) Applicant: RDA Microelectronics (Beijing) Co., Ltd., Beijing (CN)

(72) Inventors: Yifu Luan, Shanghai (CN); Kai Li, Shanghai (CN); Lichao Hu, Shanghai (CN); Junqiang Li, Shanghai (CN)

(73) Assignee: RDA Microelectronics (Beijing) Co., Ltd., Beijing (CN)

(*) Notice: Subject to any disclaimer, the term of this patent is extended or adjusted under 35 U.S.C. 154(b) by 9 days.

(21) Appl. No.: 17/576,244

(22) Filed: Jan. 14, 2022

(65) Prior Publication Data
US 2022/0141068 A1     May 5, 2022

Related U.S. Application Data

(63) Continuation of application No. PCT/CN2020/084827, filed on Apr. 15, 2020.

(30) Foreign Application Priority Data

Jul. 15, 2019 (CN) .......................... 201910639061.5

(51) Int. Cl.
 *H04L 27/26*     (2006.01)
(52) U.S. Cl.
 CPC ...... *H04L 27/2614* (2013.01); *H04L 27/2626* (2013.01)
(58) Field of Classification Search
 CPC ............. H04L 27/2614; H04L 27/2621; H04L 27/2626; H04L 5/001
 See application file for complete search history.

(56) References Cited

U.S. PATENT DOCUMENTS

| 8,457,226 B2 * | 6/2013 | Braithwaite | ........ H04L 27/2621 |
| | | | 375/267 |
| 9,893,928 B2 * | 2/2018 | Wang | .................. H04L 27/2621 |

(Continued)

FOREIGN PATENT DOCUMENTS

| CN | 1953361 A | 4/2007 |
| CN | 105659547 A | 6/2016 |

(Continued)

OTHER PUBLICATIONS

International Search Report for Application No. PCT/CN2020/084827 dated Jul. 15, 2020.

(Continued)

*Primary Examiner* — Betsy Deppe
(74) *Attorney, Agent, or Firm* — Honigman LLP; Matthew H. Szalach

(57) ABSTRACT

A method for transmitting a signal, and an apparatus, a storage medium, and a user terminal are provided. The method includes: determining a plurality of baseband signals of Component Carriers (CC); selecting a plurality of phase rotation factors and recording a number of times of selection by adding one each time of selection; determining a candidate signal and a Peak to Average Power Ratio (PAPR) of the candidate signal, wherein in response to the PAPR being greater than or equal to a preset threshold and the number of times of selections not reaching a preset number of times, reselecting phase rotation factors and re-determining another candidate signal and a PAPR of the another candidate signal, until a PAPR is less than the preset threshold or the number of times of selections reaches the preset number of times; and transmitting the candidate signal.

17 Claims, 4 Drawing Sheets

(56) References Cited

U.S. PATENT DOCUMENTS

2012/0114074 A1    5/2012  Moffatt et al.
2015/0263875 A1    9/2015  Chang et al.
2016/0269219 A1    9/2016  Wang et al.
2017/0338989 A1*  11/2017  Wu ................... H04L 27/2621

FOREIGN PATENT DOCUMENTS

| | | |
|---|---|---|
| CN | 106470179 A | 3/2017 |
| CN | 106789828 A | 5/2017 |
| CN | 106941470 A | 7/2017 |
| CN | 109274629 A | 1/2019 |
| CN | 107735942 B | 4/2020 |

OTHER PUBLICATIONS

"Novel Techniques to Reduce PAPR in OFDM Systems Using Threshold SLM", Shiragapur, Bahubali K. et al, 2013 3rd IEEE International Advance Computing Conference (IACC), Feb. 23, 2013 (pp. 515-518).
"PAPR Reduction Using Sub-Carrier Reservation in SC-FDMA Uplink", Texas Instruments, 3GPP TSG-RAN WGI Meeting #44bis R1-060926., Mar. 31, 2006, pp. 1-4.

* cited by examiner

SIGNAL TRANSMITTING METHOD AND APPARATUS, STORAGE MEDIUM, AND USER TERMINAL

CROSS-REFERENCE TO RELATED APPLICATIONS

This application is a continuation application of International Application No. PCT/CN2020/084827, filed on Apr. 15, 2020, which claims priority to Chinese Patent Application No. 201910639061.5, filed on Jul. 15, 2019, and entitled "SIGNAL TRANSMITTING METHOD AND APPARATUS, STORAGE MEDIUM, AND USER TERMINAL", the entire disclosure of which is incorporated herein by reference.

TECHNICAL FIELD

The present disclosure generally relates to communication technology field, and more particularly, to a signal transmitting method and apparatus, storage medium, and user terminal.

BACKGROUND

Nowadays, the electric power dedicated network has 10 simplex frequency points and 15 duplex frequency points allocated by the National Radio Management Committee in the 230 MHz frequency band. Each frequency point has a bandwidth of discretely and unequally spaced in 223 MHz-226 MHz and 229 MHz-233 MHz. In a high-rate data transmission, a carrier aggregation is required and a plurality of discrete frequency points are used jointly. For example, in a terminal uplink transmission, a carrier aggregation with a maximum of 16 numbers of Component Carriers (CC) is required, which far exceeds that of a common wireless network (for example, at most 5 in the LTE-Advanced).

The use of the carrier aggregation, especially with an increase of the number of CCs, inevitably increases a Peak to Average Power Ratio (PAPR) of a signal, which may lead to the signal with high PAPR be affected by a strong non-linear distortion when passing through a non-linear device, such as a power amplifier, may lead to poor indicators of an Error Vector Magnitude (EVM), an Adjacent Channel Leakage Ratio (ACLR) and soon, and may finally lead to a degradation of a system performance.

Therefore, there is a need for a method for suppression of PAPR which is suitable for a carrier aggregation with a large number of CCs.

SUMMARY

Embodiments of the present disclosure provide a method for transmitting a signal.

In an embodiment of the present disclosure, a method for transmitting a signal is provided, the method includes: determining a plurality of baseband signals of Component Carriers (CC); selecting a plurality of phase rotation factors, the plurality of phase rotation factors being in a one-to-one correspondence with the plurality of baseband signals of CC, and recording a number of times of selection by adding one each time of selection; determining a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selections not reaching a preset number of times, the determining the candidate signal and a Peak to Average Power Ratio (PAPR) of the candidate signal comprises: reselecting phase rotation factors and re-determining another candidate signal and a PAPR of the another candidate signal, until a PAPR is less than the preset threshold or the number of times of selections reaches the preset number of times; and transmitting the candidate signal; wherein, said determining the candidate signal and the PAPR of the candidate signal based on the plurality of phase rotation factors and the plurality of baseband signals of CCs includes: up-sampling and shifting each baseband signal of CC to a corresponding baseband frequency of carrier aggregation, and obtaining a plurality of carrier signals by multiplying the plurality of baseband signals of CC which are up-sampled and shifted by selected phase rotation factors, respectively; and obtaining the candidate signal by adding the plurality of carrier signals, and determining the PAPR of the candidate signal.

In an embodiment of the present disclosure, a non-transitory storage medium storing one or more programs, the one or more programs comprising computer instructions, when executed by a processor, cause the processor to: determine a plurality of baseband signals of Component Carriers (CC); select a plurality of phase rotation factors, the plurality of phase rotation factors being in a one-to-one correspondence with the plurality of baseband signals of CC, and record a number of times of selection by adding one each time of selection; determine a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selections not reaching a preset number of times, the determine the candidate signal and a Peak to Average Power Ratio (PAPR) of the candidate signal includes: reselect phase rotation factors and re-determine another candidate signal and a PAPR of the another candidate signal, until a PAPR is less than the preset threshold or the number of times of selections reaches the preset number of times; and transmit the candidate signal; wherein, said determine the candidate signal and the PAPR of the candidate signal based on the plurality of phase rotation factors and the plurality of baseband signals of CCs includes: up-sample and shift each baseband signal of CC to a corresponding baseband frequency of carrier aggregation, and obtain a plurality of carrier signals by multiplying the plurality of baseband signals of CC which are up-sampled and shifted by selected phase rotation factors, respectively; and obtain the candidate signal by adding the plurality of carrier signals, and determine the PAPR of the candidate signal.

In an embodiment of the present disclosure, a user terminal is provided, the user terminal includes a memory and a processor, wherein the memory has computer instructions stored therein, when executed by a processor, cause the processor to: determine a plurality of baseband signals of Component Carriers (CC); select a plurality of phase rotation factors, the plurality of phase rotation factors being in a one-to-one correspondence with the plurality of baseband signals of CC, and record a number of times of selection by adding one each time of selection; determine a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selections not reaching a preset number of times, the determine the candidate signal and a Peak to Average Power Ratio (PAPR) of the candidate signal includes: reselect phase rotation factors and re-determine another candidate signal and a PAPR of the another candidate signal, until a PAPR is less than the preset threshold or the number of times of selections reaches the preset number of times; and transmitting the candidate signal; wherein, said determine the candidate signal and the PAPR of the candidate signal based on the plurality of phase rotation factors and the plurality of baseband signals of CCs includes: up-sample and shift each baseband signal of CC to a corresponding baseband frequency of carrier aggregation, and obtain a plurality of carrier signals by multiplying the plurality of baseband signals of CC which are up-sampled and shifted by selected phase rotation factors, respectively; and obtain the candidate signal by adding the plurality of carrier signals, and determine the PAPR of the candidate signal.

DETAILED DESCRIPTION

Figure 1:
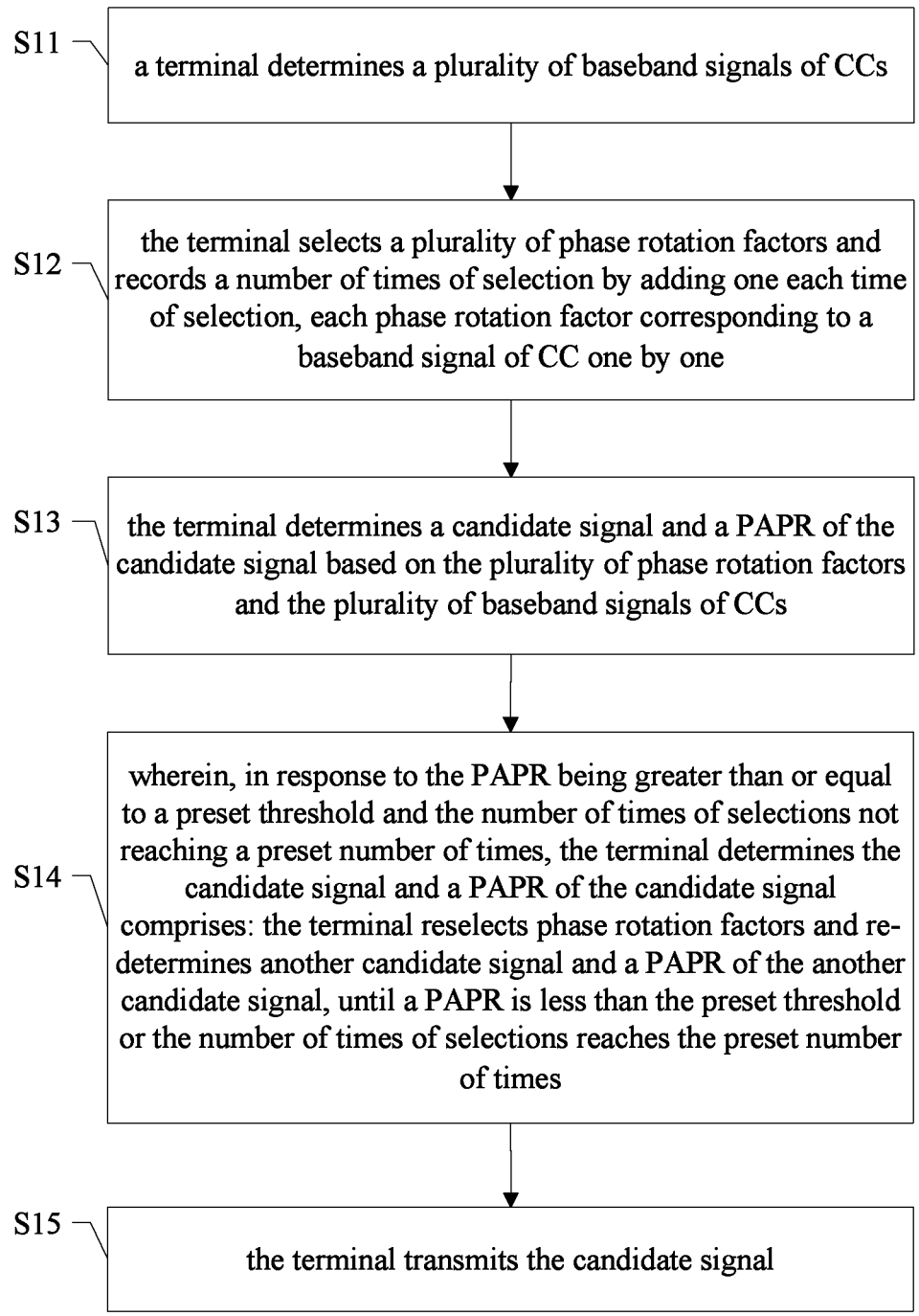
FIG. 1 schematically illustrates a flowchart of a method for transmitting a signal according to an embodiment of the present disclosure.

As described above, in an existing technology, the use of the carrier aggregation, especially with an increase of the number of CCs, inevitably increases a Peak to Average Power Ratio (PAPR) of a signal, which may lead to the signal with high PAPR be affected by a strong non-linear distortion when passing through a non-linear device, for instance, a power amplifier, may lead to poor indicators of an Error Vector Magnitude (EVM), an Adjacent Channel Leakage Ratio (ACLR) and soon, and may finally lead to a degradation of a system performance. For the 230 MHz frequency band with a total of 280 numbers of discrete frequency points, it is very important to ensure sufficient ACLR. Therefore, in practical applications, a power back-off is needed to offset the impact of a high PAPR, however, this may reduce a working efficiency of a power amplifier and a coverage of a terminal.

Currently, commonly used suppression methods for PAPR include: a signal pre-distortion type, such as a peak windowing and a peak clipping. The basic principle of the signal pre-distortion type is to directly process sampling points whose amplitude exceeds a set threshold to reduce the PAPR, and use windowing or filtering to reduce a distortion of the signal, which is easy to implementation and can achieve a good PAPR suppression effect. However, it often makes the quality of the signal worse and affects the EVM and the ACLR. The suppression methods also include a probability type, such as a selective mapping and a partial transmit sequence. The basic principle of the probability type is to generate a plurality of versions of signals to be transmitted by a phase rotation on each sub-carrier or sub-carrier group, and select the version with a lowest PAPR to transmit to achieve the PAPR suppression effect.

Inventors found that although the existing technology can basically maintain the quality of the signal, it has a high computational complexity and a high signaling overhead, and requires special processing by a receiver. In addition, in the existing technology, a series of optimization methods based on above methods are required to improve a calculation amount and the PAPR suppression effect. Therefore, an additional cost and complexity of improvement are increased.

In embodiments of the present disclosure, a terminal is adapted to select phase rotation factors one or more times which correspond to baseband signals of CCs one by one, and calculate a PAPR of a candidate signal each time of selection, until the PAPR is less than a preset threshold or a number of times of selections reaches a preset number of times. According to embodiments of the present disclosure, a high peak value caused by an in-phase superposition of signals of CCs can be eliminated as much as possible through different phase rotations of different CCs, so as to reduce the PAPR effectively. Furthermore, the above mentioned method may not distort the signal, and may not affect an EVM, an ACLR and other indicators of the signal. It is also compatible with existing suppression technology for predistorted signal PAPR, which favors to further reduce the PAPR.

In order to clarify the object, characteristic and advantages of embodiments of the present disclosure, the embodiments of present disclosure will be described clearly in detail in conjunction with accompanying drawings.

Referring to FIG. 1, a method for transmitting a signal is provided, the method may include the following S11, S12, S13, S14, and S15.

In S11, a terminal determines a plurality of baseband signals of CCs.

In S12, the terminal selects a plurality of phase rotation factors and records a number of times of selection by adding one each time of selection, the plurality of phase rotation factors being in a one-to-one correspondence with the plurality of baseband signals of CC.

In S13, the terminal determines a candidate signal and a PAPR of the candidate signal based on the plurality of phase rotation factors and the plurality of baseband signals of CCs.

In S14, wherein, in response to the PAPR being greater than or equal to a preset threshold and the number of times of selections not reaching a preset number of times, the terminal determines the candidate signal and a PAPR of the candidate signal comprises: the terminal reselects phase rotation factors and re-determines another candidate signal and a PAPR of the another candidate signal, until a PAPR is less than the preset threshold or the number of times of selections reaches the preset number of times.

In S15, the terminal transmits the candidate signal.

The terminal determines the candidate signal and the PAPR of the candidate signal based on the plurality of phase rotation factors and the plurality of baseband signals of CCs includes: up-sampling and shifting each baseband signal of CC to a corresponding baseband frequency of carrier aggregation, and the terminal obtains a plurality of carrier signals by multiplying the plurality of baseband signal of CC which is up-sampled and shifted by selected phase rotation factors, respectively; and the terminal obtains the candidate signal by adding the plurality of carrier signals, and determines the PAPR of the candidate signal.

In a specific embodiment of S11, the terminal may determine a plurality of baseband signals of CCs.

Specifically, an uplink of the electric power wireless dedicated network may use a CP-based SC-FDMA signal which has a slot of 2 ms. The CP-based SC-FDMA signal includes 6 numbers of symbols and one of them is a reference symbol. Furthermore, in an uplink transmission of the electric power wireless dedicated network, the number of the CCs makes up to 16. In this case, even if only a set containing two phase rotation factors is used, as many as 65,536 numbers of phase combinations are resulted. Therefore, the number of phase combinations needs to be reduced.

Figure 2:
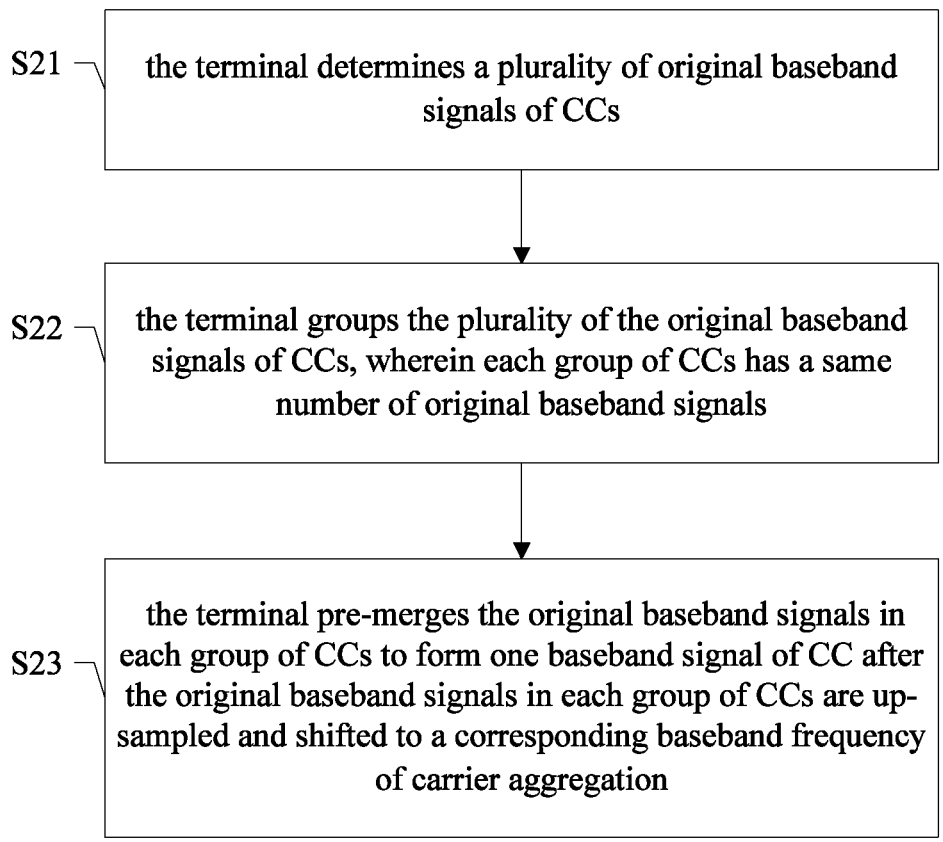
FIG. 2 schematically illustrates a flowchart of a specific embodiment of S11 in FIG. 1.

Referring to FIG. 2, FIG. 2 schematically illustrates a flowchart of a specific embodiment of S11 in FIG. 1. The plurality of baseband signals of CCs are determined based on the following S21, S22, and S23.

In S21, the terminal determines a plurality of original baseband signals of CCs.

The original baseband signals may be the CP-based SC-FDMA which is received by a terminal or generated by a terminal.

In S22, the terminal groups the plurality of the original baseband signals of CCs, wherein each group of CCs has a same number of original baseband signals.

Specifically, the terminal may group the CCs, that is, $N_{group}$ numbers of CCs share one phase rotation factor, which greatly reduces a number of phase combinations.

Furthermore, the terminal can be set so that when the number of CCs reaches the number of preset components, the terminal groups the plurality of the original baseband signals of CCs. For example, when the number of CCs is greater than or equal to 12, the terminal groups the original baseband signals of the plurality of CCs.

It should be pointed out that the number of original baseband signals in each group of CCs should not be too small, otherwise, it is difficult to achieve the effect; and the number of original baseband signals in each group of CCs should not be too large, otherwise, the PAPR suppression effect is reduced.

As a non-limiting example, the number of original baseband signals in each group of CCs may be selected from 2 to 4.

In S23, the terminal pre-merges the original baseband signals in each group of CCs to form one baseband signal of CC after the original baseband signals in each group of CCs are up-sampled and shifted to a corresponding baseband frequency of carrier aggregation.

Specifically, the terminal may add the original baseband signals in each group of CCs together after the original baseband signals in each group of CCs are up-sampled and shifted to the corresponding baseband frequency of carrier aggregation to achieve the pre-mergence.

In embodiments of the present disclosure, by grouping a plurality of original baseband signals of CCs, and pre-merging (for instance, an addition operation) the original baseband signals in each group of CCs after the original baseband signals in each group of CCs are up-sampled and shifted to a corresponding baseband frequency of carrier aggregation, a number of operations on the CCs can be reduced, thereby improving an operation efficiency.

Continue to refer to FIG. 1, in a specific embodiment of S12, the terminal may select a plurality of phase rotation factors and record a number of times of selection by adding one each time of selection, the plurality of phase rotation factors being in a one-to-one correspondence with the plurality of baseband signals of CC.

Specifically, a phase rotation is conducted in a frequency domain with the baseband signals of CC as the unit, which may avoid an IFFT operation needed after a phase rotation in the existing selective mapping method on each subcarrier, and thus greatly reduce the combination number of phase rotations. A phase rotation is conducted in a time domain with a plurality of slots as a unit, the reference symbol conducts a phase rotation same as other data symbols, which allows a receiver to directly demodulate without an additional processing.

Further, the terminal may select a phase rotation factor from a plurality of phase rotation factors, that is, the terminal may select part of the phase combinations from all possible phase combinations to reduce the amount of the calculation. Specifically, there is a high probability that there are a plurality of phase combinations that can make a signal after the carrier aggregation reach a minimum value or close to the minimum value of PAPR, therefore, there is no need to try all phase combinations.

Further, for a k-th phase rotation, a c-th CC or a group of a c-th CC is tried, the terminal may use following formula to determine the selected phase rotation factors:

Further, k-th phase rotation, a c-th CC or a group of a c-th CC is tried, the terminal may use following formula to determine the select phase rotation factors:

$$\varphi_{kc} = \Phi_{N_{phase}} \cdot i;$$

wherein $\varphi_{kc}$ represents a selected phase rotation factor, $N_{phase}$ represents a number of the phase rotation factors, $\Phi_{N_{phase}}$ represents a set of the phase rotation factors, i represents an index of the selected phase rotation factor in the set of the phase rotation factors.

The terminal may use following formula to determine the index:

$$i = \mod\left(\text{ceil}\left(\frac{k}{N_{phase}^{c-1}}\right) - 1, N_{phase}\right) + 1;$$

wherein, k represents the number of times of the selection, c represents a sequence number of the baseband signal of CC, mod represents a remainder operation, and cell represents a rounding up operation.

Further, the set of the phase rotation factors $\Phi_{N_{phase}}$ includes:

$$\left\{1, \exp\left(j \cdot \frac{1}{N_{phase}} \cdot 2\pi\right), \ldots, \exp\left(j \cdot \frac{N_{phase}-1}{N_{phase}} \cdot 2\pi\right)\right\}.$$

$N_{phase}$ represents the number of the phase rotation factors. When $N_{phase}$ takes 2 or 4, $\Phi_2=\{1,-1\}$, $\Phi_4=\{1, i, -1, -i\}$, $\Phi_4$ may replace a multiplication to a changing of positive and negative values and a swapping of real and imaginary parts, which is easy to realize by a hardware.

In a specific embodiment of S13, the terminal may determine a candidate signal and a PAPR of the candidate signal based on the plurality of phase rotation factors and the plurality of baseband signals of CCs.

The terminal determines the candidate signal and the PAPR of the candidate signal based on the plurality of phase rotation factors and the plurality of baseband signals of CCs includes: up-sampling and shifting each baseband signal of CC to a corresponding baseband frequency of carrier aggregation, and the terminal obtains a plurality of carrier signals by multiplying the plurality of baseband signals of CC which are up-sampled and shifted by selected phase rotation factors, respectively; and the terminal obtains the candidate signal by adding the plurality of carrier signals, and determines the PAPR of the candidate signal.

Specifically, the terminal up-samples and shifts each baseband signal of CC, merges the plurality of basebands of carriers, then calculates the PAPR of the signal, records the PAPR and the phase rotation factor corresponding to each CC, tries a next phase rotation, selects a phase combination with a minimal PAPR after several phase rotations, and transmits the signal.

According to embodiments of the present disclosure, a high peak value caused by an in-phase superposition of signals of CCs can be eliminated as much as possible through different phase rotations of different CCs, so as to reduce the PAPR effectively. Furthermore, the above mentioned method may not distort the signal, and may not affect an EVM, an ACLR and other indicators of the signal. It is also compatible with existing suppression technology for predistorted signal PAPR, which favors to further reduce the PAPR.

In a specific embodiment of S14, the terminal may reselect the phase rotation factors and re-determine another candidate signal and a PAPR of the another candidate signal, in response to the PAPR being greater than or equal to a preset threshold and the number of times of selections not reaching a preset number of times, until a PAPR is less than the preset threshold or the number of times of selections reaches the preset number of times.

Furthermore, the terminal may use the following formula to determine the preset number of times:

$$n = N_{CC} \wedge N_{phase} \times \frac{1}{D}$$

wherein, n represents the preset number of times, $N_{CC}$ represents a number of the baseband signals of CCs, D represents a down-sample factor of a phase combination, D>1 and D is a positive integer.

In the embodiment of the present disclosure, the terminal may only try the first 1/D of the number of possible phase combinations. The PAPR suppression effect is basically the same as when an equal and random number of phase combinations are sampled from all phase combinations, and the PAPR suppression effect just decreases a little when D is large. Further, after each phase rotation attempt, there is no need to record the phase rotation factor used by each CC while recording the PAPR, the terminal may only generate the corresponding phase combination instantly based on the number of attempts after the minimum PAPR is selected, which saves a hardware storage space.

In a specific embodiment of S15, the terminal may transmit the candidate signal.

In embodiments of the present disclosure, a terminal is adapted to select phase rotation factors one or more times which correspond to baseband signals of CCs one by one, and calculate a PAPR of a candidate signal each time of selection, until the PAPR is less than a preset threshold or a number of times of selections reaches a preset number of times. According to embodiments of the present disclosure, a high peak value caused by an in-phase superposition of signals of CCs can be eliminated as much as possible through different phase rotations of different CCs, so as to reduce the PAPR effectively. Furthermore, the above mentioned method may not distort the signal, and may not affect an EVM, an ACLR and other indicators of the signal. It is also compatible with existing suppression technology for predistorted signal PAPR, which favors to further reduce the PAPR.

Figure 3:
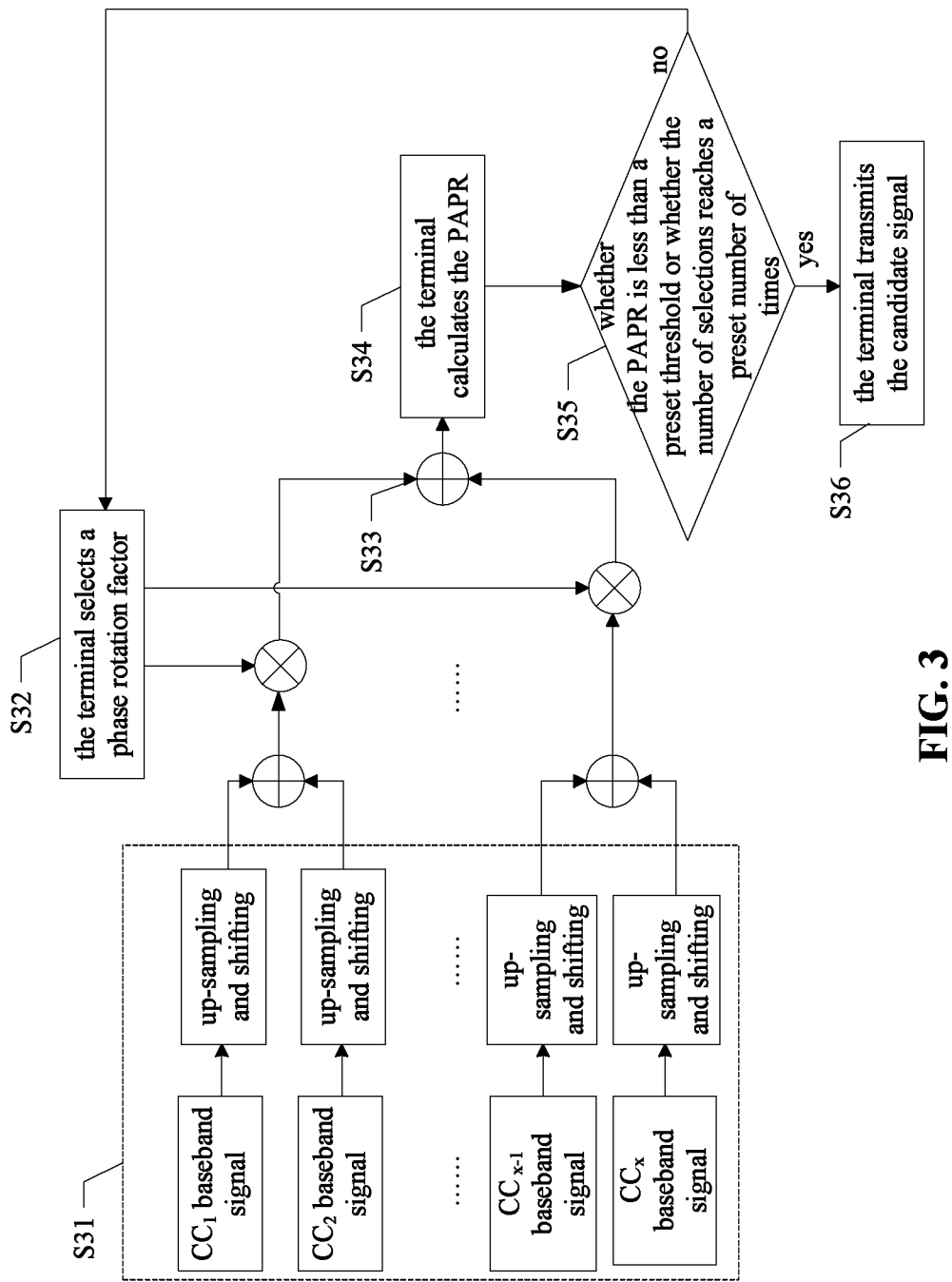
FIG. 3 schematically illustrates a schematic diagram of a working scenario of a method for transmitting a signal according to an embodiment of the present disclosure.

Referring to FIG. 3, FIG. 3 schematically illustrates a schematic diagram of a working scenario of a method for transmitting a signal according to an embodiment of the present disclosure. The following takes the number of original baseband signals of each group of CCs being two as an example. The method may include the following S31, S32, S33, S34, S35 and S36.

In S31, the terminal may determine a plurality of original baseband signals of CCs; the terminal may group the plurality of the original baseband signals of CCs; and the terminal may pre-merge the original baseband signal in each group of CCs to form one baseband signal of CC after the original baseband signals in each group of CCs are up-sampled and shifted to a corresponding baseband frequency of carrier aggregation, such as an addition operation.

The original baseband signals may include $CC_1$ baseband signal, $CC_2$ baseband signal ... $CC_{x-1}$ baseband signal, and $CC_x$ baseband signal.

In S32, for each CC, the terminal may select a phase rotation factor to multiply by each baseband signal of CC.

In S33, the terminal may add the plurality of carrier signals together.

In S34, the terminal may calculate the PAPR.

It should be pointed out that the multiplication, the frequency shift by up-sampling, the addition operation and the calculation of the PAPR mentioned above may all be conducted by an appropriate operation method, and specific operation methods are not limited in embodiments of the present invention.

In S35, the terminal may determine whether the PAPR is less than a preset threshold or whether the number of selections reaches a preset number of times. If the PAPR is less than the preset threshold or the number of selections reaches the preset number of times, S36 can be executed. If the PAPR is not less than the preset threshold or the number of selections does not reach the preset number of times, S32 can be returned to be performed, the terminal may reselect a phase rotation factor and re-determine a candidate signal and a PAPR of the candidate signal.

In S36, the terminal may transmit the candidate signal.

In the specific embodiment, more details about S31 to S36 please refer to the foregoing and the description of FIG. 1 to FIG. 2 for execution, and is not repeated herein.

In some embodiment of the present disclosure, a number of the baseband signals of CCs and a set of the phase rotation factors have a predefined mapping relationship.

In a specific embodiment, the mapping relationship may be set to not require a signaling support, for example, the relationship between the number of CCs and the basic parameters of phase rotation can be directly specified in the protocol.

In a non-limiting example, two slots may be used as a time domain unit of a phase rotation. When the number of the CCs is less than or equal to 4, $N_{phase}$ takes 4, and other parameters of the calculation take 2. A terminal may select parameters of $N_{group}$, D, and $PAPR_{thr}$ to decrease the calculation based on its capability, and there is no need to inform the base station.

In another embodiment of the present disclosure, prior to the plurality of phase rotation factors being selected, the method further includes: a start instruction of phase rotation is received; wherein, the start instruction of phase rotation is used to instruct the selection of the phase rotation factors to process the candidate signal.

In a specific embodiment, the terminal is informed whether to turn on the phase rotation and the time domain unit of the phase rotation by the base station through a signaling. The relationship between $N_{phase}$ and the number of the CCs is directly specified in the protocol.

In a non-limiting example, when the number of the CCs is less than or equal to 4, $N_{phase}$ takes 4, and other parameters of the calculation take 2. A terminal may select parameters of $N_{group}$, D, and $PAPR_{thr}$ to decrease the calculation based on its capability, and there is no need to inform the base station.

In another embodiment of the present disclosure, before the plurality of phase rotation factors are selected, the method further includes: transmitting the phase rotation factor corresponding to each baseband signal of CC.

In a specific embodiment, after receiving the starting instruction of phase rotation, the terminal informs the base station of the phase rotation factor used by each CC in each time domain unit.

In embodiments of the present disclosure, a plurality of indication manners can be set, which is helpful for the base station to determine a processing manner for the candidate signal by the terminal, so as to have an opportunity to perform preprocessing and improve a reception quality.

It should be pointed out that, in an embodiment of the present disclosure, the terminal may simulate the PAPR suppression effect of the carrier aggregation when $N_{CC}$ takes 4, 8 and 16, the modulation manner is QPSK, and 1 time slot is taken as the time domain unit. For the sake of generality, the component carriers are dispersed uniformly in the entire working frequency band in the simulation.

It can be seen that the PAPR of the carrier aggregation with 4, 8 and 16 numbers of the CCs decrease about 1.3 dB, 1.59 dB and 1.64 dB, respectively, after the phase rotation is turned on at the position of 0.1% on the CCDF curve.

Specifically, the terminal of the electric power wireless dedicated network works in the 223 MHz-235 MHz frequency band with a carrier spacing of 25 kHz, the CCs includes 6 numbers of subcarriers, a subcarrier spacing is 3.75 kHz, and the system supports flexible discrete carrier aggregation scheduling. In the PUSCH transmission, the terminal may indicates a starting carrier index by 9 bits in the DCI and indicates the number of the CCs in the PUSCH carrier aggregation by 4 bits in the DCI, and there is at least one CC and at most 16 CCs. The modulation manner is determined by the modulation capability of the terminal. The QPSK modulation is supported when the modulation capability is low. A 16 QAM and a 64 QAM modulation is additionally supported when the modulation capability is high.

After the baseband signal of each CCs is determined, the terminal may start to suppress the PAPR based on the method as shown in FIG. 1. The terminal may simulate the PAPR suppression effect of the carrier aggregation when $N_{CC}$ takes 4, 8 and 16, the modulation manner is QPSK, and 1 time slot is taken as the time domain unit. For the sake of generality, the component carriers are dispersed uniformly in the entire working frequency band in the simulation. The relationship between the carrier grouping, the phase combination extraction and other parameters and the CCs is shown in Table 1.

TABLE 1

| $N_{cc}$ | $N_{phase}$ | $N_{group}$ | D | $PAPR_{thr}$ | The number of phase combinations |
|---|---|---|---|---|---|
| 4 | 4 | 1 | 8 | 7.2 | 32 |
| 8 | 2 | 1 | 2 | 7.5 | 128 |
| 16 | 2 | 2 | 1 | 7.8 | 256 |

Figure 4:
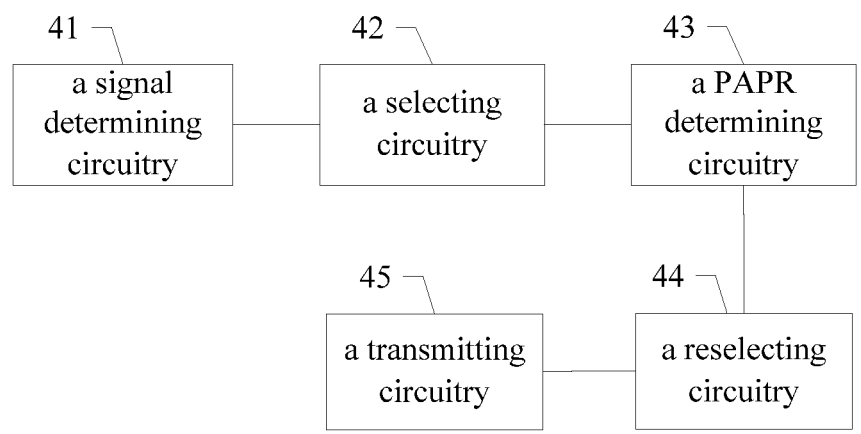
FIG. 4 schematically illustrates a structural diagram of an apparatus for transmitting a signal according to an embodiment of the present disclosure.

Referring to FIG. 4, FIG. 4 schematically illustrates a structural diagram of an apparatus for transmitting a signal according to an embodiment of the present disclosure.

The apparatus may include: a signal determining circuitry 41 which is adapted to determine a plurality of baseband signals of CCs.

A selecting circuitry 42 is adapted to select a plurality of phase rotation factors, the plurality of phase rotation factors being in a one-to-one correspondence with the plurality of baseband signals of CC, and recording a number of times of selection by adding one each time of selection.

A PAPR determining circuitry 43 is adapted to determine a candidate signal and a PAPR of the candidate signal based on the plurality of phase rotation factors and the plurality of baseband signals of CCs.

A reselecting circuitry 44 is adapted to reselect phase rotation factors and re-determine another candidate signal and a PAPR of the another candidate signal, in response to the PAPR being greater than or equal to a preset threshold and the number of times of selections does not reaching a preset number of times, until the PAPR is less than the preset threshold or the number of times of selections reaches the preset number of times.

A transmitting circuitry 45 is adapted to transmit the candidate signal.

The determining the candidate signal and the PAPR of the candidate signal based on the plurality of phase rotation factors and the plurality of baseband signals of CCs includes: up-sampling and shifting each baseband signal of CC to a corresponding baseband frequency of carrier aggregation, and obtaining a plurality of carrier signals by multiplying the plurality of baseband signals of CC which are up-sampled and shifted by selected phase rotation factors, respectively; and obtaining the candidate signal by adding the plurality of carrier signals, and determining the PAPR of the candidate signal.

For the principle, specific embodiments, and beneficial effects of the apparatus for transmitting a signal, please refer to the foregoing and the related description of the method for transmitting a signal shown in FIG. 1 to FIG. 3, which will not be repeated here.

In embodiments of the present disclosure, a terminal is adapted to select phase rotation factors one or more times which correspond to baseband signals of CCs one by one, and calculate a PAPR of a candidate signal each time of selection, until the PAPR is less than a preset threshold or a number of times of selections reaches a preset number of times. According to embodiments of the present disclosure, a high peak value caused by an in-phase superposition of signals of CCs can be eliminated as much as possible through different phase rotations of different CCs, so as to reduce the PAPR effectively. Furthermore, the above mentioned method may not distort the signal, and may not affect an EVM, an ACLR and other indicators of the signal. It is also compatible with existing suppression technology for predistorted signal PAPR, which favors to further reduce the PAPR.

It should be noted that embodiments of the present disclosure are applicable for a 5G (5 Generation) communication system, 4G and 3G communication system, and various communication systems in the future, such as 6G and 7G.

In an embodiment of the present disclosure, a storage medium having computer instructions stored therein is provided, wherein once the computer instructions are executed, the above-mentioned method is performed. The storage medium includes a computer-readable storage medium, such as a non-volatile or non-transitory memory, the storage medium may also include an optical disk, a mechanical hard disk and a solid-state hard disk or the like.

Specifically, in embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a read-only memory (ROM), a Programmable ROM (PROM), an Erasable PROM (EPROM), an electrically Erasable EPROM (EEPROM), or a flash memory. The volatile memory may be a random access memory (RAM) which functions as an external cache. By way of example but not limitation, various forms of random access memory are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchlink DRAM (SLDRAM), and Direct Rambus RAM (DR RAM).

In an embodiment of the present disclosure, a user terminal comprising a memory and a processor is provided, wherein the memory has computer instructions stored therein, and the above-mentioned method can be performed, once the processor executes the computer instructions. The user terminal includes, but is not limited to, terminal equipment such as mobile phones, computers, and tablets.

Specifically, a terminal in the embodiments of the present disclosure may refer to various forms of User Equipment (UE), access terminals, user units, user stations, Mobile Stations (MS), remote stations, remote terminals, mobile devices, user terminals, terminal equipment, wireless communication devices, user agents or user devices. The terminal device may also be a cellular phone, a cordless phone, a Session Initiation Protocol (SIP) phone, a Wireless Local Loop (WLL) station, a Personal Digital Assistant (PDA), a handheld device with the wireless communication function, a computing device or other processing devices connected with a wireless modem, vehicle equipments, wearable devices, terminal devices in the future 5G network, terminal devices in the future Public Land Mobile Network (PLMN), and the like, which is not limited in embodiments of the present disclosure.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for transmitting a signal, comprising:
   determining a plurality of baseband signals of Component Carriers (CC);
   selecting a plurality of phase rotation factors, the plurality of phase rotation factors being in a one-to-one correspondence with the plurality of baseband signals of CC, and recording a number of times of selection by adding one each time of selection;
   determining a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selection not reaching a preset number of times, the determining the candidate signal and the PAPR of the candidate signal comprises: reselecting phase rotation factors and re-determining another candidate signal and a PAPR of the another candidate signal, until the PAPR of the another candidate signal is less than the preset threshold or the number of times of selection reaches the preset number of times; and
   transmitting the candidate signal or the another candidate signal;
   wherein said determining the candidate signal and the PAPR of the candidate signal based on the plurality of phase rotation factors and the plurality of baseband signals of CCs comprises:
   up-sampling and shifting each baseband signal of CC to a corresponding baseband frequency of carrier aggregation, and obtaining a plurality of carrier signals by multiplying the plurality of baseband signals of CC which are up-sampled and shifted by selected phase rotation factors, respectively; and
   obtaining the candidate signal by adding the plurality of carrier signals, and determining the PAPR of the candidate signal.

2. The method according to claim 1, wherein the plurality of phase rotation factors are selected based on a following formula:

$$\varphi_{kc} = \Phi_{N_{phase}} \cdot i$$

wherein $\varphi_{kc}$ represents a selected phase rotation factor, $N_{phase}$ represents a number of the phase rotation factors, $\Phi_{N_{phase}}$ represents a set of the phase rotation factors, and i represents an index of the selected phase rotation factor in the set of the phase rotation factors;

wherein following formula is used to determine the index:

$$i = \mathrm{mod}\left(\mathrm{ceil}\left(\frac{k}{N_{phase}^{c-1}}\right) - 1, N_{phase}\right) + 1$$

wherein k represents the number of times of the selection, and c represents a sequence number of the baseband signal of CC.

3. The method according to claim 2, wherein the set of the phase rotation factors $\Phi_{N_{phase}}$ comprises:

$$\left\{1, \exp\left(j \cdot \frac{1}{N_{phase}} \cdot 2\pi\right), \ldots, \exp\left(j \cdot \frac{N_{phase}-1}{N_{phase}} \cdot 2\pi\right)\right\}.$$

4. The method according to claim 1, wherein following formula is used to determine the preset number of times:

$$n = N_{CC} \wedge N_{phase} ? \frac{1}{D}$$

wherein n represents the preset number of times, $N_{CC}$ represents a number of the baseband signals of CCs, D represents a down-sample factor of a phase combination, D>1 and D is a positive integer.

5. The method according to claim 1, wherein a number of the plurality of baseband signals of CCs and a set of the phase rotation factors have a predefined mapping relationship.

6. The method according to claim 1, prior to selecting the plurality of phase rotation factors, the method further comprising:
receiving a start instruction of phase rotation;
wherein the start instruction of phase rotation is used to instruct the selection of the phase rotation factors to determine the candidate signal.

7. The method according to claim 1, further comprising:
transmitting the plurality of phase rotation factors corresponding to the plurality of baseband signals of CC.

8. A non-transitory storage medium storing one or more programs, the one or more programs comprising computer instructions, when executed by a processor, cause the processor to:
determine a plurality of baseband signals of Component Carriers (CC);
select a plurality of phase rotation factors, the plurality of phase rotation factors being in a one-to-one correspondence with the plurality of baseband signals of CC, and record a number of times of selection by adding one each time of selection;
determine a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selection not reaching a preset number of times, the determine the candidate signal and the PAPR of the candidate signal comprises: reselect phase rotation factors and re-determine another candidate signal and a PAPR of the another candidate signal, until the PAPR of the another candidate signal is less than the preset threshold or the number of times of selection reaches the preset number of times; and
transmit the candidate signal or the another candidate signal;
wherein said determining the candidate signal and the PAPR of the candidate signal based on the plurality of phase rotation factors and the plurality of baseband signals of CCs comprises:
up-sampling and shifting each baseband signal of CC to a corresponding baseband frequency of carrier aggregation, and obtain a plurality of carrier signals by multiplying the plurality of baseband signals of CC which are up-sampled and shifted by selected phase rotation factors, respectively; and
obtaining the candidate signal by adding the plurality of carrier signals, and determine the PAPR of the candidate signal.

9. The non-transitory storage medium according to claim 8, wherein the plurality of phase rotation factors are selected based on a following formula:

$$\varphi_{kc} = \Phi_{N_{phase}} \cdot i$$

wherein represents a selected phase rotation factor, $N_{phase}$ represents a number of the phase rotation factors, $\Phi_{N_{phase}}$ represents a set of the phase rotation factors, and $i$ represents an index of the selected phase rotation factor in the set of the phase rotation factors;

wherein following formula is used to determine the index:

$$i = \mathrm{mod}\left(\mathrm{ceil}\left(\frac{k}{N_{phase}^{c-1}}\right) - 1, N_{phase}\right) + 1$$

wherein k represents the number of times of selection, and c represents a sequence number of the baseband signal of CC.

10. The non-transitory storage medium according to claim 9, wherein the set of the phase rotation factors $\Phi_{N_{phase}}$ comprises:

$$\left\{1, \exp\left(j \cdot \frac{1}{N_{phase}} \cdot 2\pi\right), \ldots, \exp\left(j \cdot \frac{N_{phase}-1}{N_{phase}} \cdot 2\pi\right)\right\}.$$

11. The non-transitory storage medium according to claim 8, wherein following formula is used to determine the preset number of times:

$$n = N_{CC} {}^{\wedge} N_{phase} ? \frac{1}{D}$$

wherein n represents the preset number of times, $N_{CC}$ represents a number of the baseband signals of CCs, D represents a down-sample factor of a phase combination, D>1 and D is a positive integer.

12. The non-transitory storage medium according to claim 8, wherein a number of the plurality of baseband signals of CCs and a set of the phase rotation factors have a predefined mapping relationship.

13. The non-transitory storage medium according to claim 8, wherein prior to selecting the plurality of phase rotation factors, the processor is further caused to:
receive a start instruction of phase rotation;
wherein the start instruction of phase rotation is used to instruct the selection of the plurality of phase rotation factors to determine the candidate signal.

14. The non-transitory storage medium according to claim 8, when computer instructions in the programs executed by a processor, further cause the processor to:
transmit the plurality of phase rotation factors corresponding to the plurality of baseband signals of CC.

15. A user terminal comprising a memory and a processor, wherein the memory has computer instructions stored therein, when executed by a processor, cause the processor to:
determine a plurality of baseband signals of Component Carriers (CC);
select a plurality of phase rotation factors, the plurality of phase rotation factors being in a one-to-one correspondence with the plurality of baseband signals of CC, and record a number of times of selection by adding one each time of selection;
determine a candidate signal and a Peak to Average Power Ratio (PAPR) of the candidate signal based on the plurality of phase rotation factors and the plurality of baseband signals of CCs, wherein in response to the PAPR being greater than or equal to a preset threshold and the number of times of selection not reaching a preset number of times, the determine the candidate signal and the PAPR of the candidate signal comprises: reselect phase rotation factors and re-determine another candidate signal and a PAPR of the another candidate signal, until the PAPR of the another candidate signal is less than the preset threshold or the number of times of selection reaches the preset number of times; and transmit the candidate signal or the another candidate signal;

wherein said determining the candidate signal and the PAPR of the candidate signal based on the plurality of phase rotation factors and the plurality of baseband signals of CCs comprises:

up-sampling and shifting each baseband signal of CC to a corresponding baseband frequency of carrier aggregation, and obtain a plurality of carrier signals by multiplying the plurality of baseband signals of CC which are up-sampled and shifted by selected phase rotation factors, respectively; and obtaining the candidate signal by adding the plurality of carrier signals, and determine the PAPR of the candidate signal.

16. The user terminal according to claim 15, wherein the plurality of phase rotation factors are selected based on a following formula:

$\varphi_{kc} = \Phi_{N_{phase}, i}$ wherein $\varphi_{kc}$ represents a selected phase rotation factor, $N_{phase}$ represents a number of the phase rotation factors, $\Phi_{N_{phase}}$ represents a set of the phase rotation factors, and i represents an index of the selected phase rotation factor in the set of the phase rotation factors;

wherein following formula is used to determine the index:

$$i = \mod\left(\text{ceil}\left(\frac{k}{N_{phase}^{c-1}}\right) - 1, N_{phase}\right) + 1$$

wherein k represents the number of times of selection, and c represents a sequence number of the baseband signal of CC.

17. The user terminal according to claim 16, wherein the set of the phase rotation factors $\Phi_{N_{phase}}$ comprises:

$$\left\{1, \exp\left(j \cdot \frac{1}{N_{phase}} \cdot 2\pi\right), \ldots, \exp\left(j \cdot \frac{N_{phase}-1}{N_{phase}} \cdot 2\pi\right)\right\}.$$

* * * * *